United States Patent [19]

Muste Llambrich

[11] 4,275,898
[45] Jun. 30, 1981

[54] OSCILLATION ABSORBER FOR TRAILER HITCHES

[76] Inventor: Pedro Muste Llambrich, Avenida Generalisimo 73, Amposta (Tarragona), Spain

[21] Appl. No.: 963,154

[22] Filed: Nov. 22, 1978

[30] Foreign Application Priority Data

Nov. 22, 1977 [ES] Spain ................................. 232.357

[51] Int. Cl.³ .............................................. B60D 1/06
[52] U.S. Cl. ................................. 280/446 B; 280/511
[58] Field of Search ................ 280/446 B, 432, 511, 280/512, 513, 488

[56] References Cited

U.S. PATENT DOCUMENTS 3,512,803   5/1970   Hines et al. ........................... 280/432

FOREIGN PATENT DOCUMENTS 2256648   7/1975   France ................................. 280/446 B Primary Examiner—John A. Pekar
Attorney, Agent, or Firm—Michael J. Striker

[57] ABSTRACT

An oscilation absorbing device for use in trailer hitches includes a ball connected to a rear support which is joined to a tractor and a receptor chamber for receiving the ball. The receptor chamber is mounted on a trailer and arranged to turn around the ball. A cover plate encompasses the receptor chamber which is provided with a horizontal pivot. The receptor chamber is pivotally mounted with respect to the ball to permit free angular displacement of the cover plate around the horizontal pivot. The device is also provided with a damping device operatively connected to the ball and including a fluid chamber having a housing with diametral wings and diametral scoops radially outwardly extending from the central axle of the housing.

6 Claims, 4 Drawing Figures

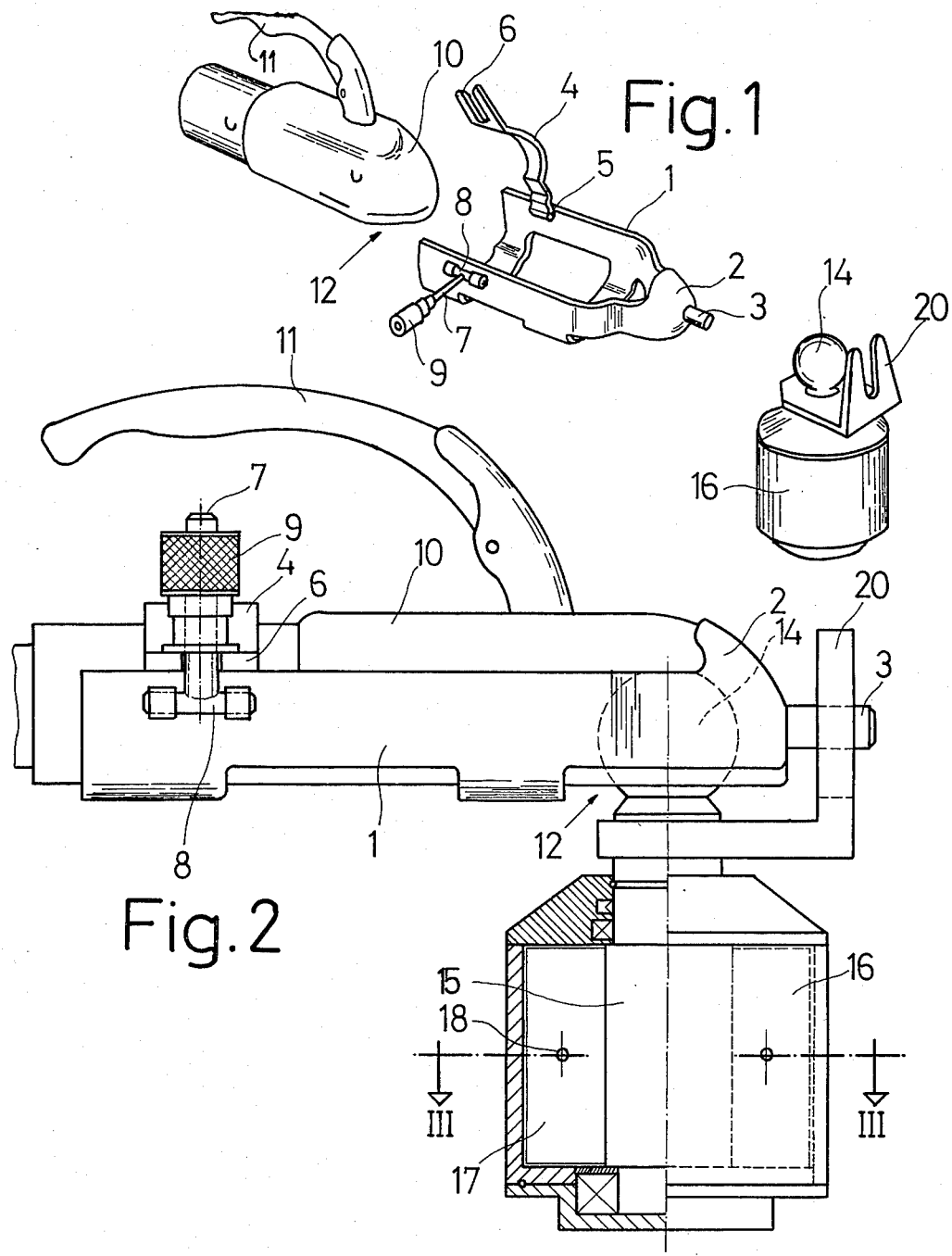

OSCILLATION ABSORBER FOR TRAILER HITCHES

BACKGROUND OF THE INVENTION

The present invention refers to an oscillation absorber for trailer hitches, whose structure is very simple and it is extraordinarily efficient.

In the steering of trailers there exists a problem which has not been resolved until the present time. This problem is the tendency of the trailer to oscillate from one side to the other around its linkage with the tractor. This oscillation can be produced by the wind or by changing direction suddenly or even due to air current created by a heavy vehicle when it passes another one that has a trailer. These situations and others are especially produced with the trailers called caravans due to their considerable volume and light weight.

SUMMARY OF THE INVENTION

With the aim of avoiding these oscillations and to improve steering of a vehicle with a trailer, the oscillation absorber object of this invention has been invented. It can be easily fitted to the conventional linkages.

The oscillation absorber for trailer hitches of the type that are composed of an interlocked ball of a rear support joined to a tractor and a coupling device with the possibility of turning around the ball, mounted on the trailer, it is characterized by the fact that the coupling device joined to the trailer consists of a recipient chamber for the ball and a linkcoupled cover plate joint to the axle of the same which allows for free angular displacement of the cover plate joint on a vertical plane and on an oscillating plane around the horizontal axle of the cover plate joint, although breaks it in the horizontal oscillation direction.

More specifically the cover plate joint can be made up of a longitudinal pivot that tightly fits into a fork, the pivot of the coupling device of the trailer goes preferentially and the fork in the ball support.

A realization in which the ball is interlocked into an axle to which some radial turning scoops tightly in the inside of a chamber which contains a fluid, for example, oil of an appropriate viscosity is provided for.

In order to complete the absorbing action, some radial wings have been joined to the inner surface of the chamber which contains the fluid, which adjust around the axle, whose wings are in al alternate position with regards to the turning scoops.

The provision of openings, whose number and diameter will depend on the degree of braking or absorption that one desires to obtain, in the scoops has been foreseen. It will be in harmony with the degree of fluidity of the oil used as a fluid.

In order to be able to adapt this device to the known hitches, it has been seen to that the cover plate joint pivot be interlocked to an interlinkable frame detachable to a conventional trailer hitching device.

This frame consists of a casing with openings in order to give space to the operating lever of the hitch, provided with an adjustable clamp around the body of the hitch, whose position remains blocked by means of a pressure screw.

In order to understand that which is described in the present specification better, some drawings accompany this specification, only as an example, and they represent a practical case of realizing the object of the invention.

BRIEF DESCRIPTION OF THE DRAWINGS

In said drawings, FIG. 1 is a view in perspective of an explosion of the shock absorber; FIG. 2 is a view in lateral elevation, partially cross-split, of the shock absorber in the work position.

DETAILED DESCRIPTION OF THE INVENTION

Figure 3:
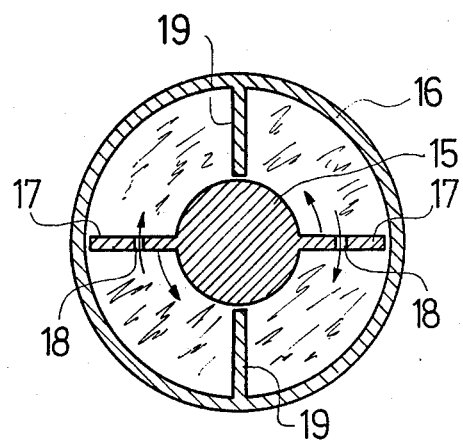
FIG. 3 is a view in section III—III of FIG. 2.
Figure 4:
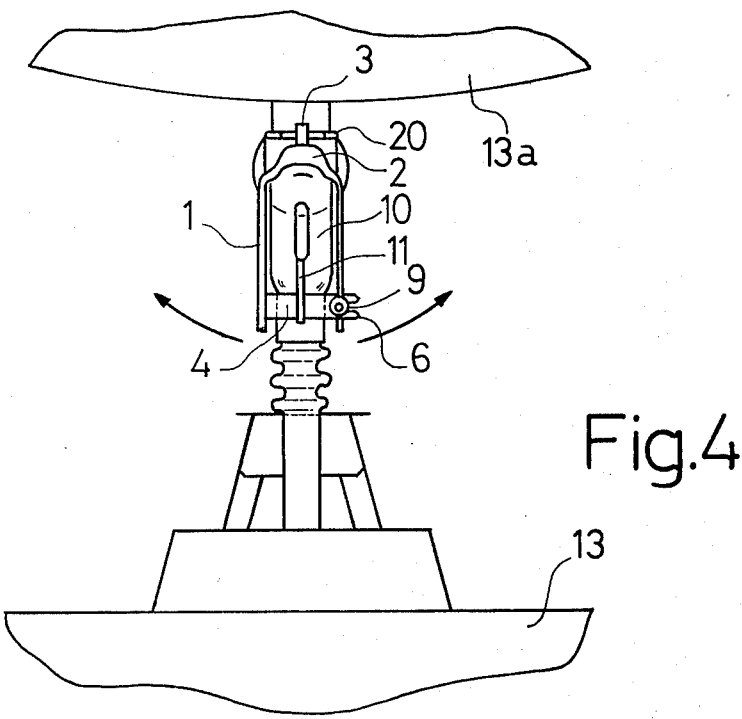
FIG. 4 is a ground view of the shock absorber itself mounted on a trailer.

The oscillation absorber for trailer hitches consists of in the drawings of a casing 1 of noticeable fluted configuration, with a closed end 2, of which a coaxial pivot 3 comes out. This casing is provided with a clamp 4 link coupled at an end 5 and the opposite end is provided with a fork 6, in which a link-coupled screw 7 can be adjusted at the same time in the casing itself by means of an axle 8, whose screw is coupled to a pressure nut 9 in order to retain the clamp in the working position. This casing is bound to fix itself around the conventional trailer hitch 10, holder of a operating lever 11 which protudes beyond the casing in order that it can be operated without any difficulty. This hitch disposes of a chamber 12 for its coupling to a ball that normally forms part of the normal trailer hitches, the hitch 10 being fixed to the trailer 13 and the ball in the tractor 13a.

The shock absorber described alo has an interlocked ball 14 of an axle 15, rotary mounted on the inside of a hermetically closed chamber 16 and that contains a fluid, whose axle is provided with two diametral scoops 17 that adjust to the inner surface of the chamber 16, whose scoops dispose of an opening 18, at least. In the inner surface of the chamber 16 some wings 19, in diametral arrangement, are mounted. It adjusts to the axle 15 and arranged in an alternate position in regards to the scoops 17.

In adjoining position to the ball 14, the axle 15 is provided with a fork 20 located on the outside of the chamber 16.

The operation of the shock absorber is as follows: in the first place the casing 1 is coupled to the normal hitch 10' of the trailer 13, anchoring its position by means of a clamp 4, retained by the action of the nut 9 in the shank 7. In this position, one proceeds with the coupling of the hitch 10 to the ball 14, which is coupled to the chamber 12, in the normal manner of the trailer hitches. At the proper time, the pivot 3 remains adjusted to the fork 20. In this position, it is understood that the hitch permits the oscillation of the trailer, on a vertical plane, for example when it travels by a ford or transversal off-level on the highway since the pivot 3 is displaced along the fork 20. It also permits the oscillation of the trailer around the longitudinal axle of the hitch, for example, when a wheel of the trailer goes over an off-level, since the stub 3 turns freely over itself, in the inside of the fork 20. Now then, the lateral oscillation on the horizontal plane implies the turning of the fork, and consequently, of the axle 15, which offers resistance due to the difficulty that the scoops 17 bathed in oil which the chamber 16 contains find. This oscillation that can be produced on the curves or by the wind is absorbed, in whatever the direction of the same may be. The absorbing action can be perfectly graduated, using the number of adequate openings 18 and according to the grade of fluidity of the oil used.

In the illustration that accompanies the present specification an absorbing device has been represented, in which the pivot 3 is interlocked in a chamber casing 1 bound to be coupled to a conventional hitch 10. Now then, it is evident that this arrangement is done with the aim of adapting the shock absorber to hitches which are already known, and with the aim of not introducing modifications in the same, which would make the installation more expensive.

Nevertheless, it is possible to carry out a hitch 10, which is directly provided with the pivot 3, with which the casing 1 will be unnecessary.

In regards to the chamber 16 it is logically provided with the means of mounting to the rear part of the tractor 13a, which will be in contact with the normal support devices in the vehicles bound to use trailers.

The materials used in the building of the distinct component parts of the oscillations absorber, forms and dimensions of the same, and as many accessory details that can be filed, as long as they do not affect its essential being, will be independent from the object of invention.

I claim:

1. An oscillation absorbing device for use in trailer hitches, comprising a ball connected to a rear support joined to a tractor; coupling means mounted on the trailer and arranged to turn around said ball, said coupling means including a receptor chamber for receiving said ball; a cover plate encompassing said receptor chamber, having a horizontal pivot connected thereto and pivotally arranged within a forked-shaped mounting member to permit free angular displacement of said cover plate around said horizontal pivot; damping means including an axle connected to said ball; and said mounting member being secured to said axle.

2. The oscillation absorbing device of claim 1, wherein said cover plate includes clamping means having a shank member at one side of said cover plate and a clamp link secured to an opposite side of said cover plate, said clamp link is terminated with a fork which tightly embraces said shank member in a clamping position.

3. The oscillation absorbing device of claim 1, wherein said damping means include a fluid chamber having a housing with diametral wings integral with said housing and extending radially inwardly from said housing, said axle is arranged within said housing and formed with diametral scoops integral with said axle and extending radially outwardly from said axle.

4. The oscillation absorbing device of claim 3, wherein said wings and said scoops are located in alternate position within said chamber.

5. The oscillation absorbing device of claim 4, wherein said scoops are provided with a plurality of openings to permit the flow of fluid between said scoops and said wings thereby providing the turning movement of said scoops.

6. The oscillation absorbing device of claim 1, wherein said cover plate is formed with an opening to provide a passage for an operating lever of the hitch.

* * * * *